(12) United States Patent
Vasseur et al.

(10) Patent No.: US 10,187,413 B2
(45) Date of Patent: Jan. 22, 2019

(54) NETWORK-BASED APPROACH FOR TRAINING SUPERVISED LEARNING CLASSIFIERS

(71) Applicant: Cisco Technology, Inc., San Jose, CA (US)

(72) Inventors: Jean-Philippe Vasseur, Anchorage, AK (US); Andrea Di Pietro, Lausanne (CH); Grégory Mermoud, Veyras (CH); Fabien Flacher, Antony (FR)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/212,597

(22) Filed: Jul. 18, 2016

(65) Prior Publication Data

US 2017/0279839 A1    Sep. 28, 2017

Related U.S. Application Data

(60) Provisional application No. 62/313,483, filed on Mar. 25, 2016.

(51) Int. Cl.
*H04L 29/06* (2006.01)
*G06F 17/18* (2006.01)
*G06N 99/00* (2010.01)
*H04L 29/08* (2006.01)

(52) U.S. Cl.
CPC .......... *H04L 63/1425* (2013.01); *G06F 17/18* (2013.01); *G06N 99/005* (2013.01); *H04L 63/145* (2013.01); *H04L 63/1416* (2013.01); *H04L 67/10* (2013.01); *H04L 63/02* (2013.01); *H04L 63/1458* (2013.01)

(58) Field of Classification Search
CPC ............. H04L 63/1425; H04L 63/1416; H04L 63/145; H04L 63/02; H04L 67/10; G06F 17/18; G06N 99/005
USPC ......................................................... 726/23
See application file for complete search history.

(56) References Cited

U.S. PATENT DOCUMENTS

| 8,813,228 | B2 | 8/2014  | Magee et al.    |
|-----------|----|---------|-----------------|
| 8,881,281 | B1 | 11/2014 | Mitchell        |
| 9,160,760 | B2 | 10/2015 | Vasseur et al.  |
| 9,215,244 | B2 | 12/2015 | Ayyagari et al. |

(Continued)

OTHER PUBLICATIONS

Lee, Wenke, et al. "A data mining and CIDF based approach for detecting novel and distributed intrusions." International Workshop on Recent Advances in Intrusion Detection. Springer, Berlin, Heidelberg, 2000.*

(Continued)

*Primary Examiner* — Syed A Zaidi
(74) *Attorney, Agent, or Firm* — Parker Ibrahim & Berg LLP; James M. Behmke; Stephen D. LeBarron

(57) ABSTRACT

In one embodiment, a supervisory device in a network receives traffic data from a security device that uses traffic signatures to assess traffic in the network. The supervisory device receives traffic data from one or more distributed learning agents that use machine learning-based anomaly detection to assess traffic in the network. The supervisory device trains a traffic classifier using the received traffic data from the security device and from the one or more distributed learning agents. The supervisory device deploys the traffic classifier to a selected one of the one or more distributed learning agents.

20 Claims, 11 Drawing Sheets

(56) References Cited

U.S. PATENT DOCUMENTS

| | | | |
|---|---|---|---|
| 2002/0191544 A1* | 12/2002 | Cheng | H04L 29/06 370/236 |
| 2003/0005100 A1* | 1/2003 | Barnard | H04L 29/12113 709/223 |
| 2004/0215972 A1* | 10/2004 | Sung | H04L 63/1408 726/23 |
| 2004/0255157 A1* | 12/2004 | Ghanea-Hercock | G06F 21/552 726/23 |
| 2007/0192863 A1* | 8/2007 | Kapoor | G06F 9/505 726/23 |
| 2010/0153316 A1 | 6/2010 | Duffield et al. | |
| 2012/0158395 A1* | 6/2012 | Hughes | H04L 63/00 703/21 |
| 2014/0237599 A1 | 8/2014 | Gertner et al. | |
| 2014/0245378 A1 | 8/2014 | Faltyn et al. | |
| 2014/0283052 A1 | 9/2014 | Jordan et al. | |
| 2014/0325649 A1 | 10/2014 | Zhang | |
| 2015/0012827 A1 | 1/2015 | Elmeih et al. | |
| 2015/0163121 A1 | 6/2015 | Mahaffey et al. | |

OTHER PUBLICATIONS

Elovici, Yuval, et al. "Applying machine learning techniques for detection of malicious code in network traffic." Annual Conference on Artificial Intelligence. Springer, Berlin, Heidelberg, 2007.*

Pahlevanzadeh, B., et al. "A cluster-based distributed hierarchical IDS for MANETs." International Conference on Network Applications, Protocols and Services. 2008.*

Nasr et al. "An Intrusion Detection and Prevention System based on Automatic Learning of Traffic Anomalies" I. J. Computer Network and Information Security; 2016; pp. 1-8.

Alex Pinto "From Threat Intelligence to Defense Cleverness: A Data Science Approach" MLSec—Machine Learning Security; pp. 1-49.

European Search Report dated Aug. 7, 2017 in connection with European Application No. 17 16 2422.

* cited by examiner

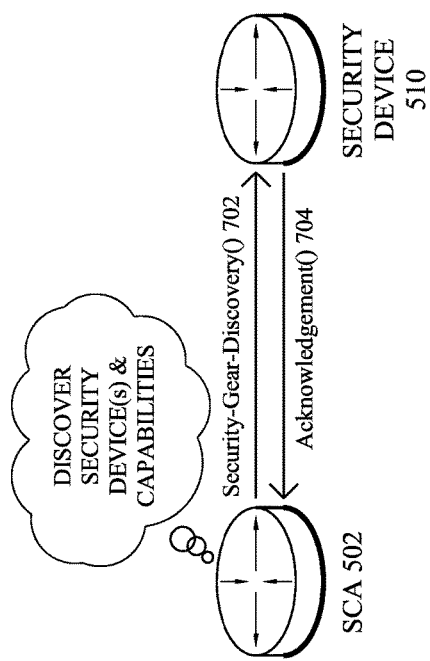
FIG. 7A
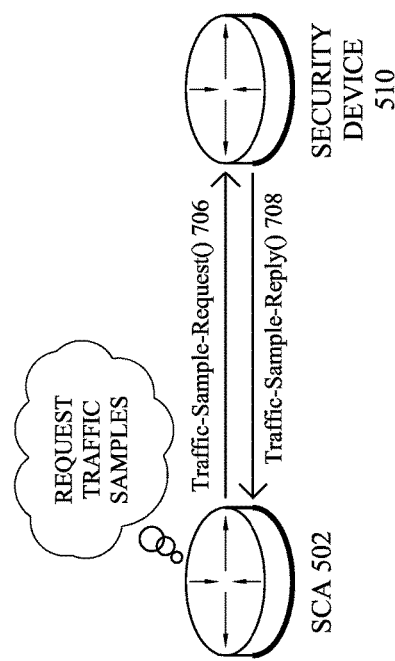
FIG. 7B
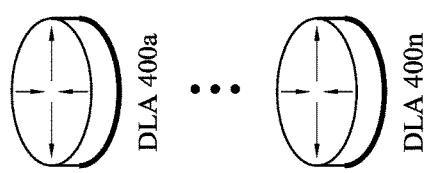
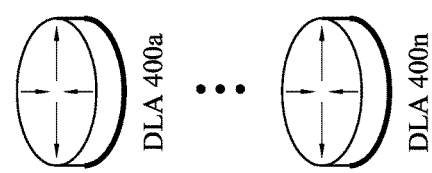

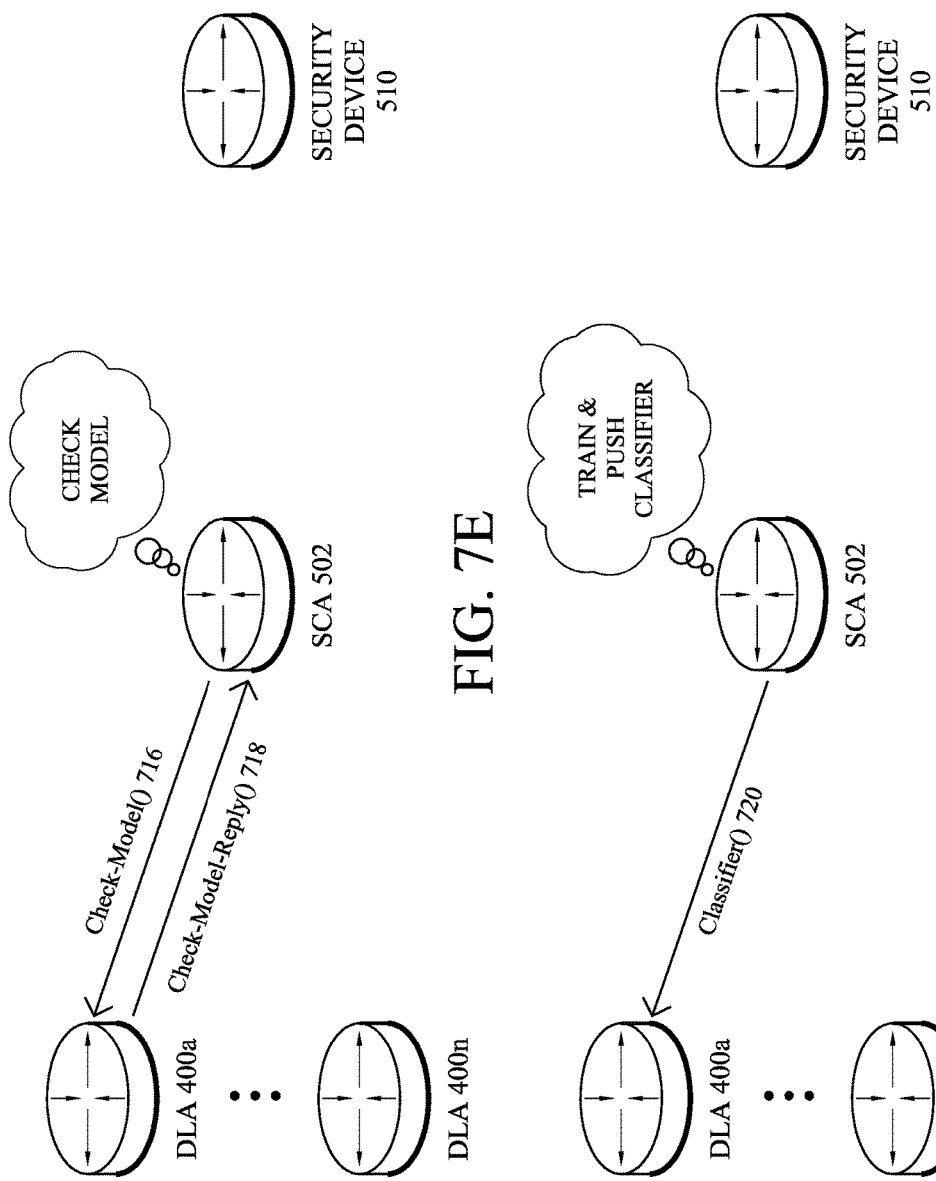

NETWORK-BASED APPROACH FOR TRAINING SUPERVISED LEARNING CLASSIFIERS

RELATED APPLICATION

This application claims priority to U.S. Provisional Application No. 62/313,483, filed on Mar. 25, 2016, entitled INTERFACING MACHINE LEARNING SYSTEMS WITH EXTERNAL SECURITY SYSTEMS, by Vasseur, et al., the contents of which are incorporated herein by reference.

TECHNICAL FIELD

The present disclosure relates generally to computer networks, and, more particularly, to a network-based approach for training supervised learning classifiers.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7F illustrate examples of the use of traffic data to train a classifier.

DESCRIPTION OF EXAMPLE EMBODIMENTS

Overview

Figure 1A:
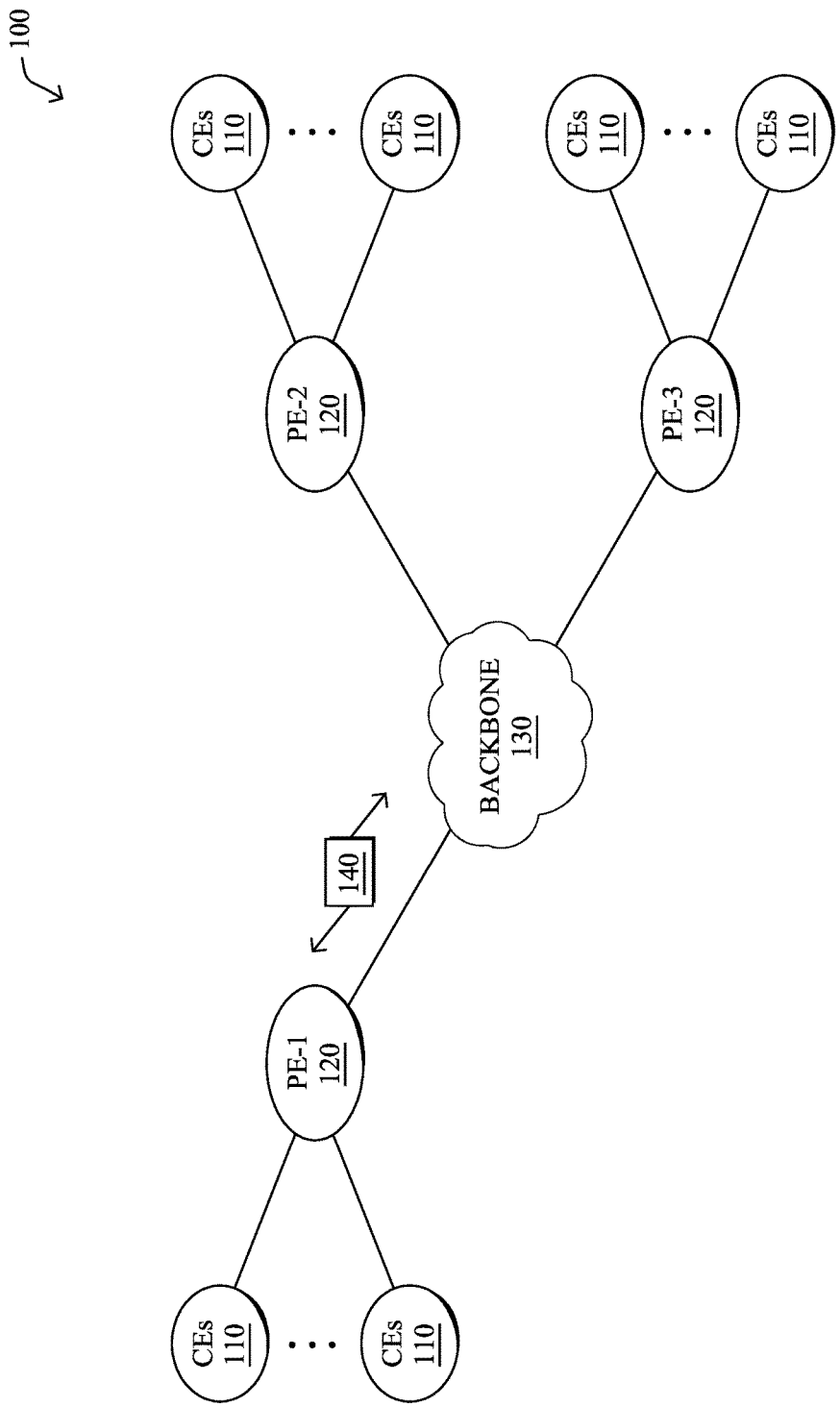
FIGS. 1A-1B illustrate an example communication network.

According to one or more embodiments of the disclosure, a supervisory device in a network receives traffic data from a security device that uses traffic signatures to assess traffic in the network. The supervisory device receives traffic data from one or more distributed learning agents that use machine learning-based anomaly detection to assess traffic in the network. The supervisory device trains a traffic classifier using the received traffic data from the security device and from the one or more distributed learning agents. The supervisory device deploys the traffic classifier to a selected one of the one or more distributed learning agents.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
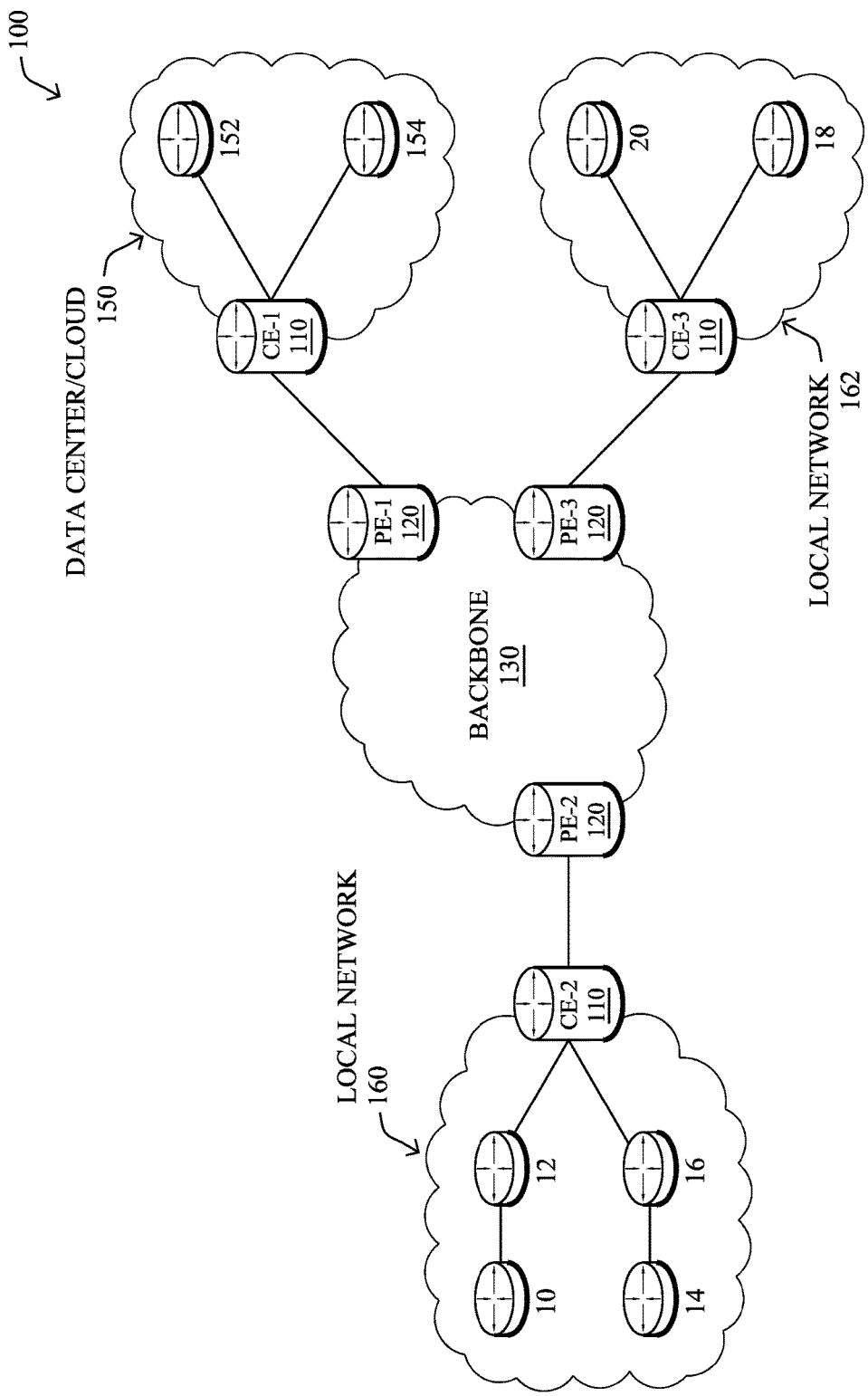

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
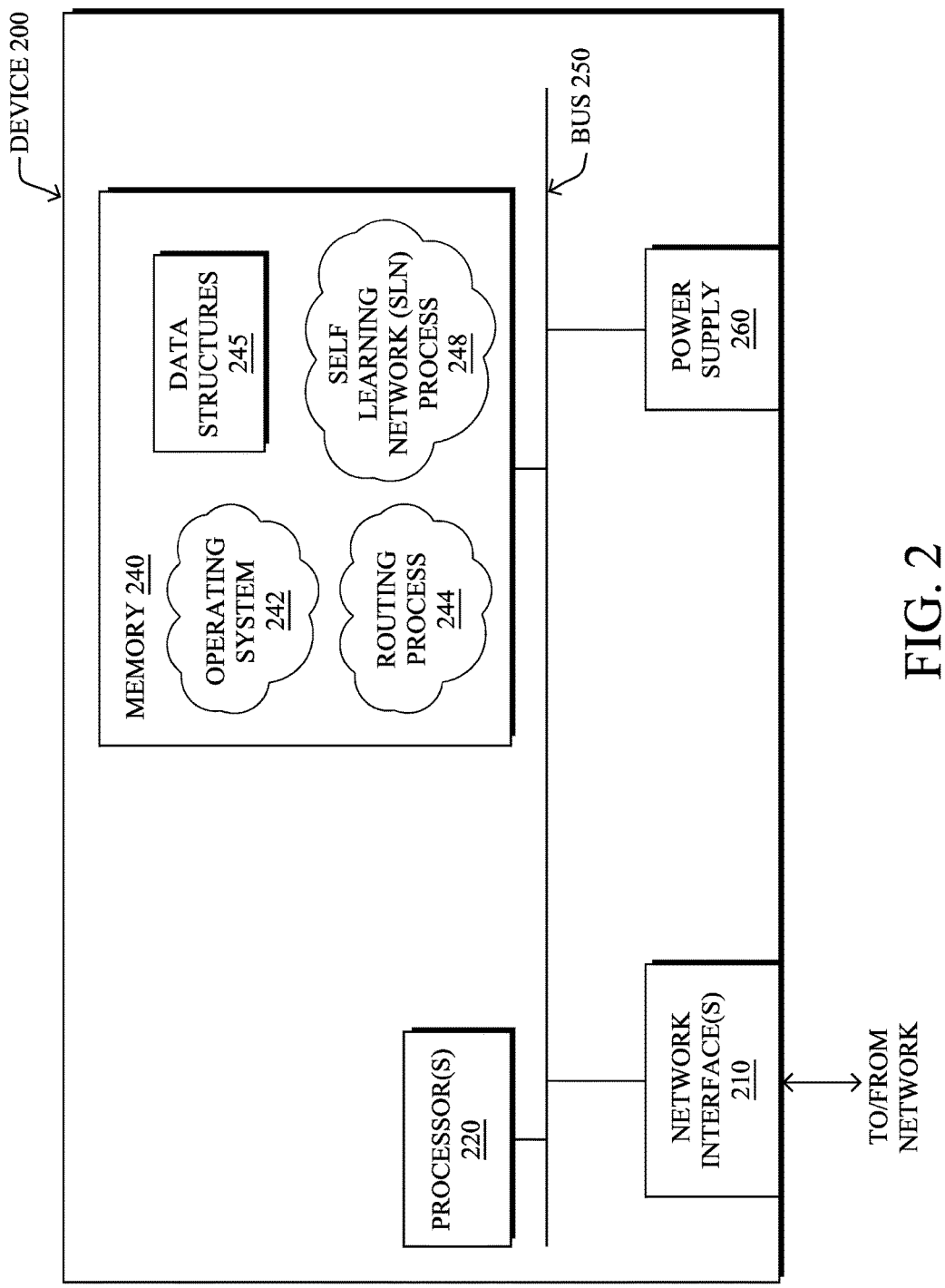
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
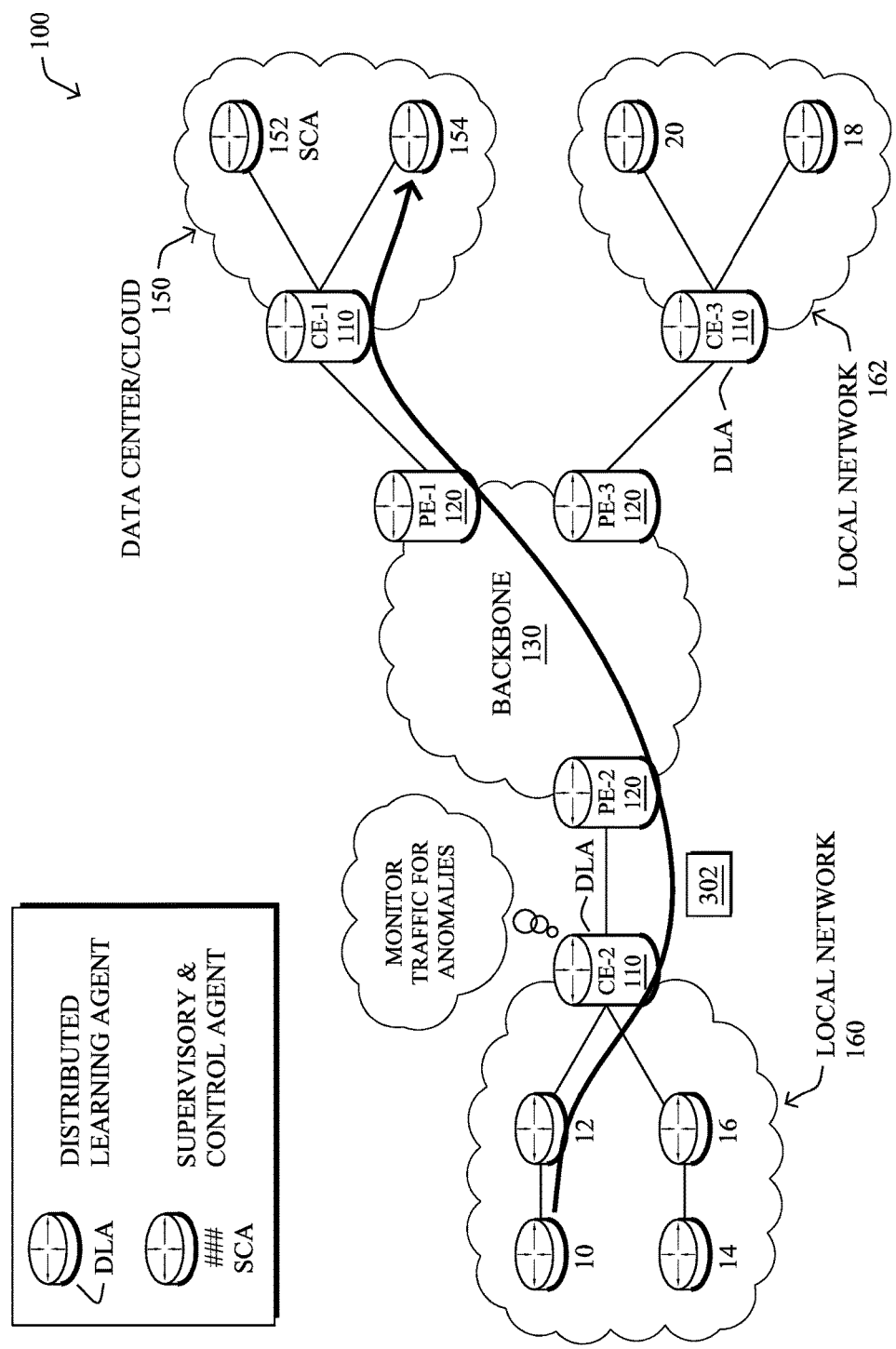
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
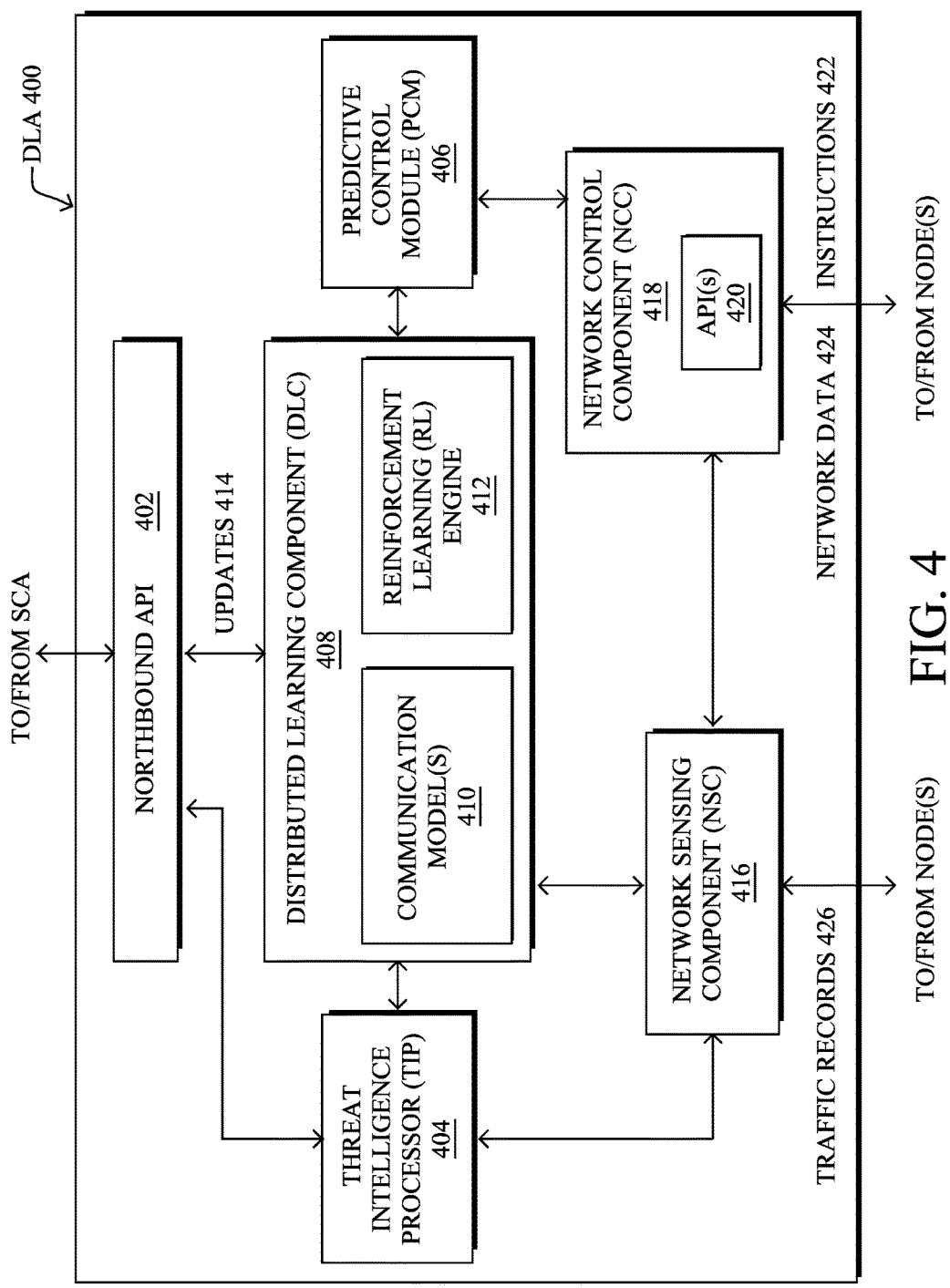
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In other words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, a DLA may leverage machine learning, to detect anomalous network behavior. This is in contrast to other techniques, such as signature-based approaches, that instead attempt to match an observed network behavior to a known pattern of interest (e.g., a known attack pattern, etc.). For example, while a traditional security device such as a firewall, intrusion detection system (IDS), or intrusion prevention system (IPS) may use signatures to determine that a particular type of attack is underway in the network, a DLA (e.g., an edge router) may simply assess whether or not the traffic in the network is anomalous/suspicious.

In the case of anomaly detection, two classes of machine learning may be used, namely unsupervised and supervised machine learning. Supervised machine learning is notoriously known for its efficacy that has been considerably improved thanks to the emergence of technologies such as deep learning. However, one of challenges of supervised learning is to access to a vast number of labeled (positive and negative) samples in order to increase recall and precision, while avoiding over-fitting. The performance of supervised systems is greatly conditioned by the efficiency of the employed machine learning technique, the quality of features, as well as the amount and diversity of data used to train the classifier (e.g., the quality of the labeled data). It has been proven that the amount of samples used for training may have as great of an impact on the overall performance as the selected machine learning technique itself.

Network-Based Approach for Training Supervised Learning Classifiers

The techniques herein allow for the interconnection of security and anomaly detection control and data planes, in order to automatically train supervised learning processes, thus dramatically increasing their overall performance. Said differently, the techniques herein allow an anomaly detection node (e.g., an SCA of an SLN) to dynamically discover a set of security devices and request the sending of traffic from the security device to the requestor that matches a set of given rules (e.g., matching one or more signatures, suspicious and normal (negative matching) along a number of criterion, etc.). The node may use the requested traffic data from the security device (e.g., a firewall, etc.) with traffic data from the distributed learning agents, to dynamically train a classifier in the network both using normal and suspicious traffic according to its current detection performance.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, a supervisory device in a network receives traffic data from a security device that uses traffic signatures to assess traffic in the network. The supervisory device receives traffic data from one or more distributed learning agents that use machine learning-based anomaly detection to assess traffic in the network. The supervisory device trains a traffic classifier using the received traffic data from the security device and from the one or more distributed learning agents. The supervisory device deploys the traffic classifier to a selected one of the one or more distributed learning agents.

Figure 5:
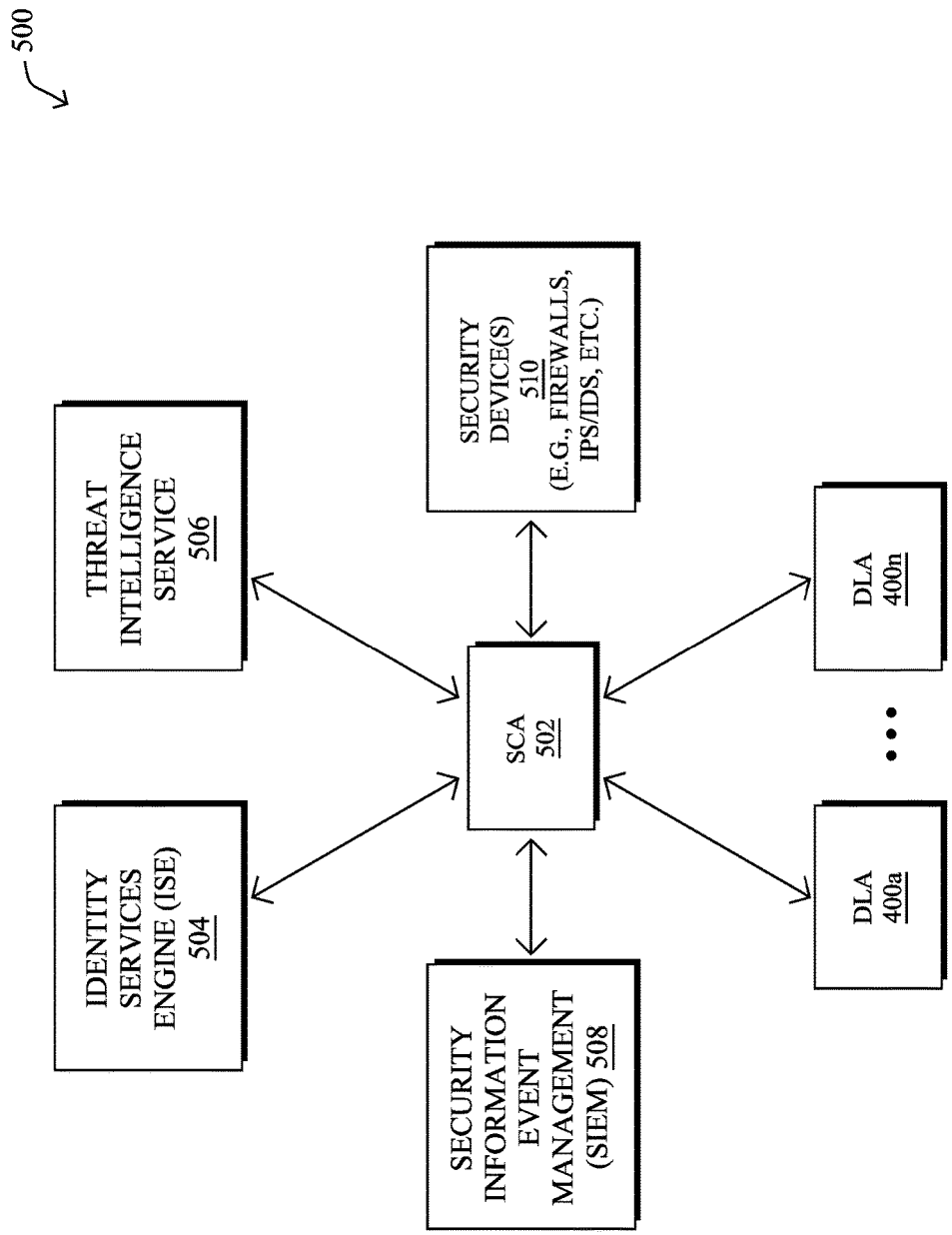
FIG. 5 illustrates an example of interfacing an SLN with external security systems.

Operationally, FIG. 5 illustrates an example of interfacing an SLN with external security systems, according to various embodiments. As described previously, system 500 may comprise an SLN that has any number of DLAs 400a-400n (e.g., a first through n$^{th}$ DLA) in communication with an SCA 502. In various embodiments, SCA 502 may also be in communication with an identity services engine 504, one or more threat intelligence services 506, a security information event management (SEIM) 508, and/or one or more security devices 510.

ISE 504 may provide data to SCA 502 for purposes of context enrichment regarding any detected anomalies by DLAs 400a-400n. For example, ISE 504 may provide an IP address (e.g., key), an audit session ID, user anomaly detection domain information, a MAC address, ESP status, NAS IP and port, Posture, TrustSec information including security group tag (SGT), endpoint profile name, or the like, to SCA 502. In turn, SCA 502 may use this supplied information to garner further context from a detected anomaly.

Threat intelligence services 506 may provide threat intelligence feed data to SCA 502, to further assess any anomalies detected by DLAs 400a-400n. Notably, a number of threat intelligence platforms/services have been developed over the past few years, such as OpenDNS, Talos, Web-Based Reputation Scores (WBRS), and ThreatGrid, all available from Cisco Systems, Inc. of San Jose, Calif. These and similar platforms provide several services in order to retrieve index of compromise (IOC)-relevant threat contexts. For example, OpenDNS provides an IP address lookup service to retrieve information such as any current association with threats, historical associations to domains, autonomous system number (ASN) details, etc. Likewise, Talos provides continually updated universal resource locator (URL) and IP blacklists based on thousands of sensors located throughout the world. In another example, WBRS provides web reputation and web categorization information based on domain names and IP addresses. Further, Threat-Grid provides several behavioral pieces of information based on sandboxing of file samples that have been submitted for analysis.

SEIM 508 may communicate with SCA 502 to push anomaly events into a security database. For example, SEIM 508 and SCA 502 may communicate system logs using the Cisco Express Format (CEF) or Cisco interaction manager (CIM) message formats.

According to various embodiments, SCA 502 may also communicate with one or more security devices 510. Such devices may include, for example, firewalls, intrusion detection system (IDS) devices, intrusion protection system (IPS) devices, other security appliances, or the like. For example, SCA 502 may use an API to trigger a mitigation action from security device(s) 510, such as dropping certain traffic, lowering a priority of certain traffic, etc.

Figure 6:
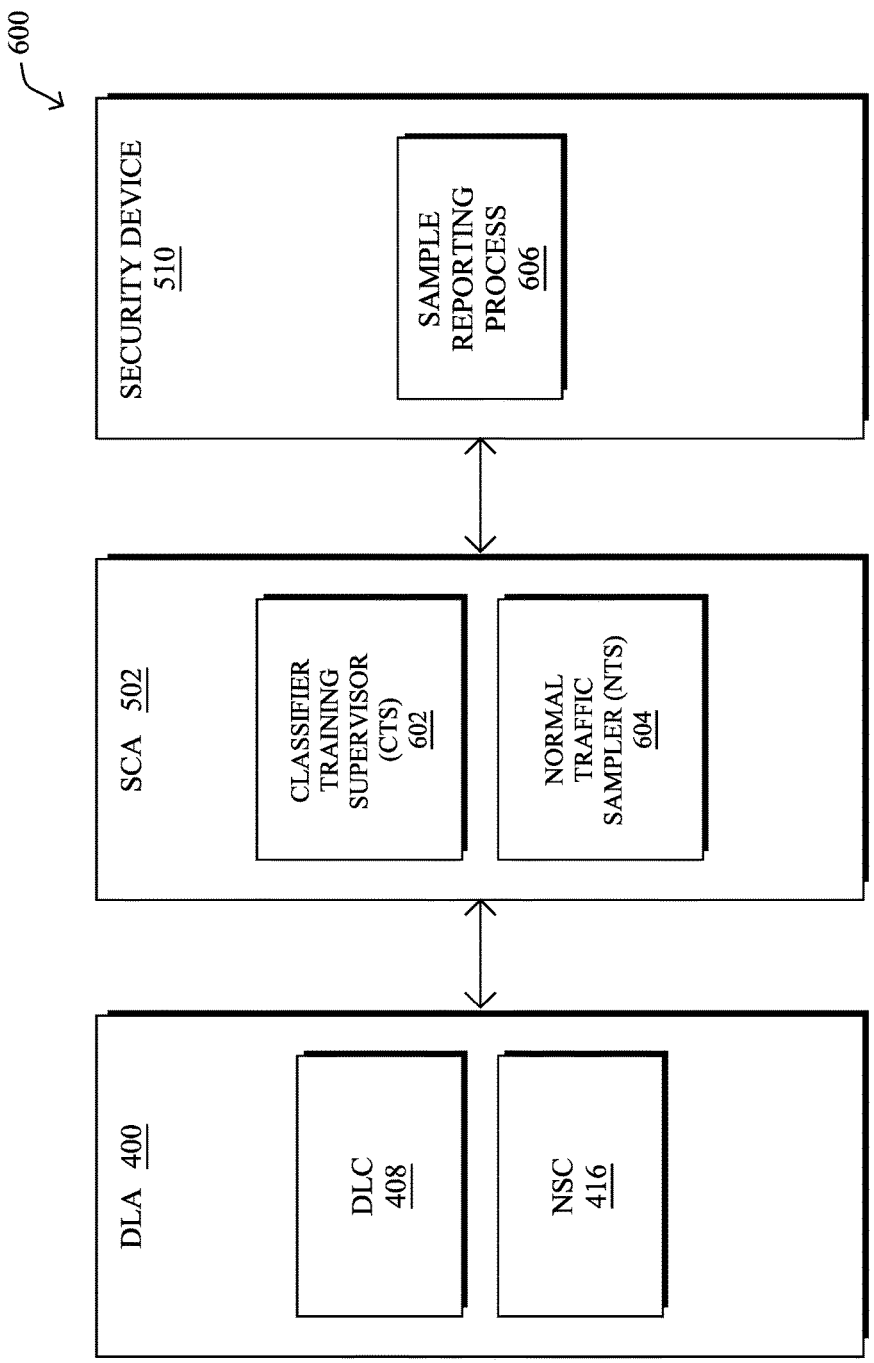
FIG. 6 illustrates an example architecture for interfacing an SLN with external security systems.

FIG. 6 illustrates an example architecture 600 for interfacing an SLN with external security systems, in accordance with various embodiments herein. As described above, SCA 502 may be in communication with a DLA 400 and an illustrative security device 510, such as a firewall, IDS/IPS device, etc. Also, as noted, DLA 400 may execute Distributed Learning Component (DLC) 408 configured to use machine learning to detect anomalies in the network based, e.g., on traffic data collected by Network Sensing Component (NSC) 416.

In various embodiments, SCA 502 may execute a Classifier Training Supervisory (CTS) 602 that, as detailed below, is configured to train and deploy traffic classifiers. In addition, SCA 502 may execute a Normal Traffic Sampler (NTS) 604 configured to obtain samples of traffic considered "normal," for use by CTS 602 when training a classifier. Notably, CTS 602 may train the classifier using traffic data from both security device 510 (e.g., as reported by a sample reporting process 506) and from DLA 400, resulting in a supervised traffic classifier capable of evaluating traffic at DLA 400. In turn, SCA 502 may deploy the classifier to DLA 400 for use in conjunction with its anomaly detection mechanisms.

FIGS. 7A-7F illustrate examples of the use of traffic data to train a classifier, according to various embodiments. One aspect of the techniques herein relates to the automatic discovery of a security device (e.g., a firewall, IPS, IDS, etc.) along with its respective capabilities. To that end, SCA 502 may send a custom unicast or multicast message illustratively named Security-Gear-Discovery( ) message 702 to a set of one or more security devices 510. In some embodiments, Security-Gear-Discovery( ) message 702 may be a type-length-value (TLV)-based message that allows the anomaly detection controller (e.g., SCA 502), to discover the capability of security devices. A non-exhaustive list of such capabilities may include the device type of security device 510, set of signatures uploaded on security device 510, a mode of operation (e.g., pull/push) that security device 510 should use to provide traffic data, or the like. SCA 502 may retrieve the initial list of IP address(es) of security device(s) 510 (and potentially their capabilities), using a central registry or policy manager. Alternatively, SCA 502 may discovery the security device(s) 510 automatically by sending a multicast message to such devices after they join a multicast group.

Upon receiving a Security-Gear-Discovery( ) message 702, a security device 510 may, after checking that the request is valid, secured, and from an authorized requester, process the request. In response, security device 510 may return an Acknowledgment( ) message 704 that includes either the set of requested/supported properties or a negative acknowledgement, potentially accompanied with an error code.

Another aspect of the techniques herein supports two modes of operation, after discovery of security device 510. In the first mode (pull), security device 510 replies to the requester (e.g., SCA 502) exclusively upon request (e.g., when asked), whereas in the second mode of operation, security device 510 is asked to provide regular updates in an unsolicited fashion when pre-defined rules are matched (expiration of a timer, traffic conditions, etc.).

As shown in FIG. 7B, SCA 502 may send a newly defined message named Traffic-Sample-Request( ) message 706 to security device 510. In various embodiments, Traffic-Sample-Request( ) message 706 may include any or all of the following:

- Mode of Operation: e.g., whether the traffic data should be sent by security device 510 on a pull or push basis;
- Matching signature: specifies the signature that must match the traffic of interest. In some cases, A* may be used to indicate "all";
- Non Matching Signature: specifies the interest of SCA 502 to gather traffic that is known as not matching a given signature, which may be of high interest to train classifier with normal traces;
- Matching Conditions: timer, ACL used to indicate the traffic of interest, local threshold (amount of suspicious traffic exceeding a threshold), number of times a signature matched, PCAP format (zip, maximum size, etc.) and potential encapsulation (e.g. GRE, etc.);
- Traffic Type: the type of traffic to be sent, e.g., "suspicious" (only send traffic matching the signature) or "both" (send traffic flagged as suspicious and normal traffic).

For example, message 706 may request that security device 510 send every hour all traffic that has matched signature 51 coming from outside of the network. In another example, message 706 may request that security device 510 send traffic matching all signatures in unsolicited fashion and samples of traffic that do not match signature S2.

In response to message 706, security device 510 may send a Traffic-Sample-Reply( ) message 708 to SCA 502 at the appropriate time. Generally, message 708 may include the traffic data requested via message 706 (e.g., the traffic data that matches the requested criteria). For example, message 708 may include, but is not limited to, (zipped) packet traces along with the signature name, the nature of the traffic (e.g., suspicious vs. normal), other parameters such as time stamps, IP prefixes and ranges, ACL matching suspicious traffic in the trace, application ID (DPI), and so on.

Figure 7C:
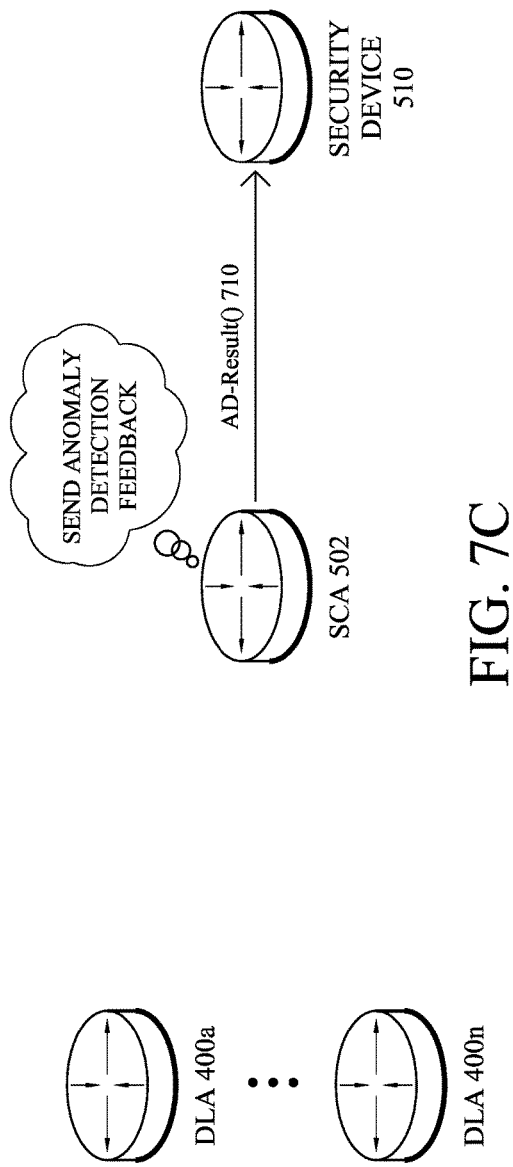

Referring now to FIG. 7C, SCA 502 may send an optional anomaly detection (AD)-Result( ) message 710 to security device 510. Such a message allows the anomaly detection system to provide feedback to the security system, in order to update its own status (e.g., by providing a measure of its current level of efficacy). For example, message 710 may be based on a local assessment of whether the classifier trained by SCA 502 is able to detect the suspicious traffic in Traffic-Sample-Reply message 708. In turn, SCA 502 may provide its status to the previously requested security device 510 and optionally to other security management systems.

The components specified above allow for the collection of traffic data from the vantage point(s) of security device(s) 510. However, a highly distributed anomaly detection system such as an SLN is likely to be deployed on a potentially much greater number of sensors that would be widely spread at the edge of the network. Since the traffic observed by each of those sensors (e.g., DLAs, etc.) is potentially different from the traffic observed by the security devices 510 (e.g., firewalls, IPS/IDS, etc.), there is no guarantee that the performance of a classifier trained using only the traffic data included in Traffic-Sample-Reply message(s) 708 from security device(s) 510 would be entirely representative of the classifier performance.

In various embodiments, the techniques herein further propose an additional component whose goal is to retrieve representative traffic samples from the edge sensors (e.g., DLAs 400) of the distributed anomaly detection system and to combine it with the anomalous traffic samples provided by the security device(s) 510, in order to produce a high-coverage data set.

In particular, as noted above, SCA 502 may execute a Normal Traffic Sampler (NTS) 604 that is in charge of selecting from which sensor (e.g., DLA) to collect traffic data. Its goal is to create a data set which is representative of all the possible types of normal traffic which can be observed by the sensors, while minimizing the amount of bandwidth required for collecting such information.

Figure 7D:
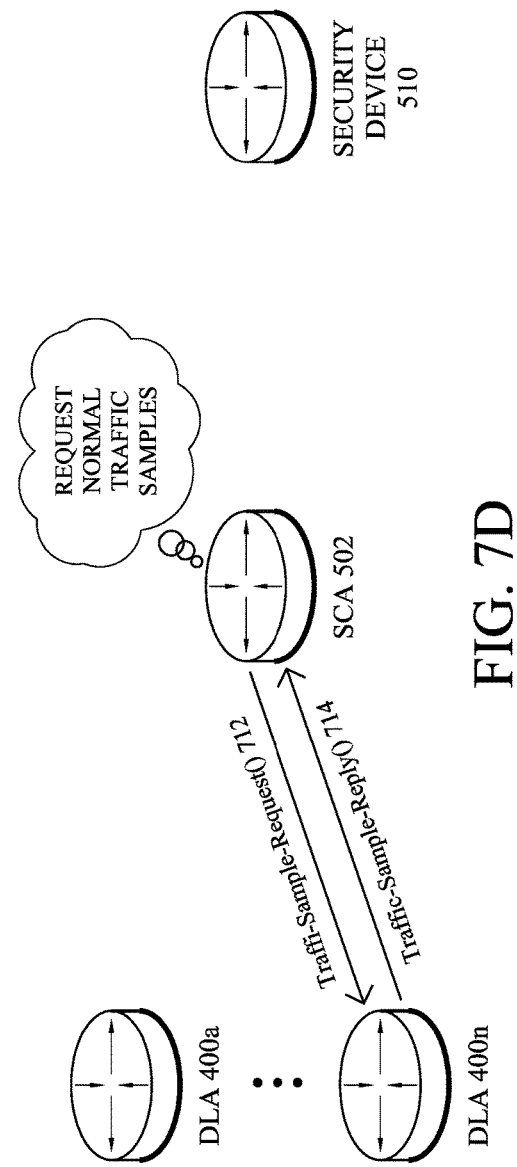

In a first instantiation, NTS 604 may collect traffic from each of the anomaly detection sensors/DLAs 400a-400n under its management. In particular, as shown in FIG. 7D, NTS 604 of SCA 502 may send a Traffic-Sample-Request( ) message 712 to each of the sensors/DLAs 400a-400n, to collect traffic samples at different times of the day and the week. It is the responsibility of NTS 604 to schedule sample collections (e.g., from DLAs 400a-400n and/or from security devices 510), so as to keep the bandwidth consumption under a certain threshold. In another embodiment, NTS 604 may retrieve a description of the network topology from a policy server, which will allow for optimization of the data collection so as not to saturate common network links (e.g. NTS 604 can choose sensors in different areas of the network so that their path towards SCA 502 are as disjoint as possible).

In another embodiment, NTS 604 may leverage an a-priori classification of the anomaly detection sensors/DLAs 400a-400n into different categories based on the kind of traffic observed by the sensors (e.g. retail branches, remote offices, etc.). Instead of collecting traffic from all of the sensors, NTS 604 may then collect traffic from a few representatives of each category, thus reducing bandwidth consumption and collection time.

In response to receiving a Traffic-Sample-Request( ) message 712, the receiving DLA may return the requested traffic data to SCA 502 via a Traffic-Sample-Reply( ) message 714. For example, message 714 may include traffic data that the anomaly detector of DLA 400n deemed "normal"/"not anomalous."

In yet another embodiment, as shown in FIG. 7E, NTS 604 may:

Collect traffic from a specific sensor/DLA 400*n* (e.g., as shown in FIG. 7D);

Create a statistical model for such a traffic sample (note: several modelling techniques can be used, such as histograms, auto-encoders, etc.);

Pick up another candidate sensor/DLA 400*a*;

Send it a Check_Model( ) message 716 carrying the parameters of the computed model;

Receive a Check_Model_Reply( ) message 718 from the sensor/DLA 400*a* specifying whether the model is representative of its observed traffic; and If the reply is negative (i.e., the traffic observed by the sensor is significantly different from that which the model represents), SCA 502 may send a Traffic-Sample-Request( ) message to the sensor/DLA. Otherwise, SCA 502 may skip it from the traffic data collection process.

Note that the advantage of this embodiment is to choose only a few representatives for each traffic categories without the need of a-priori information.

Once NTS 604 has collected a large enough set of traffic samples, it will mix each sample with the different anomaly samples that it retrieved from the security device(s) 510 and add the result to the training data set.

As shown in FIG. 7F, SCA 502 may use the traffic data from both DLAs 400*a*-400*n*, as well as from security device(s) 510, to train and/or update a traffic classifier. Notably, Classifier Training Supervisor (CTS) 602 of SCA 502 may be responsible for requesting data using the above components and perform the training of the classifier based on the received data. In a first stage, CTS 602 operates in unsolicited mode in order to collect a lot of traffic data for the construction of an initial training set. Then, once the classification performance increases for one or more classes, CTS 602 may switch to an on-demand mode where it requests samples only for "confirming" that its estimate of the classifier performance is appropriate.

The type of classifier builds by CTS 602 may vary, but Deep Neural Networks (DNN) are excellent candidates for this type of applications, as they require a lot of training data and computational resources (both of which are available to CTS 602 since it is located in the datacenter). While DNNs are expensive to train, they are cheap to evaluate. Hence, CTS 602 may periodically push the trained classifier to the edge, along with statistics about its accuracy for various signatures. For example, SCA 502 may push the trained classifier to a selected DLA 400*a* via a Classifier( ) message 720. In turn, DLA 400*a* may use this classifier to detect anomalies directly and/or enhance the features of its existing anomaly detection process with the output of this classifier.

Figure 8:
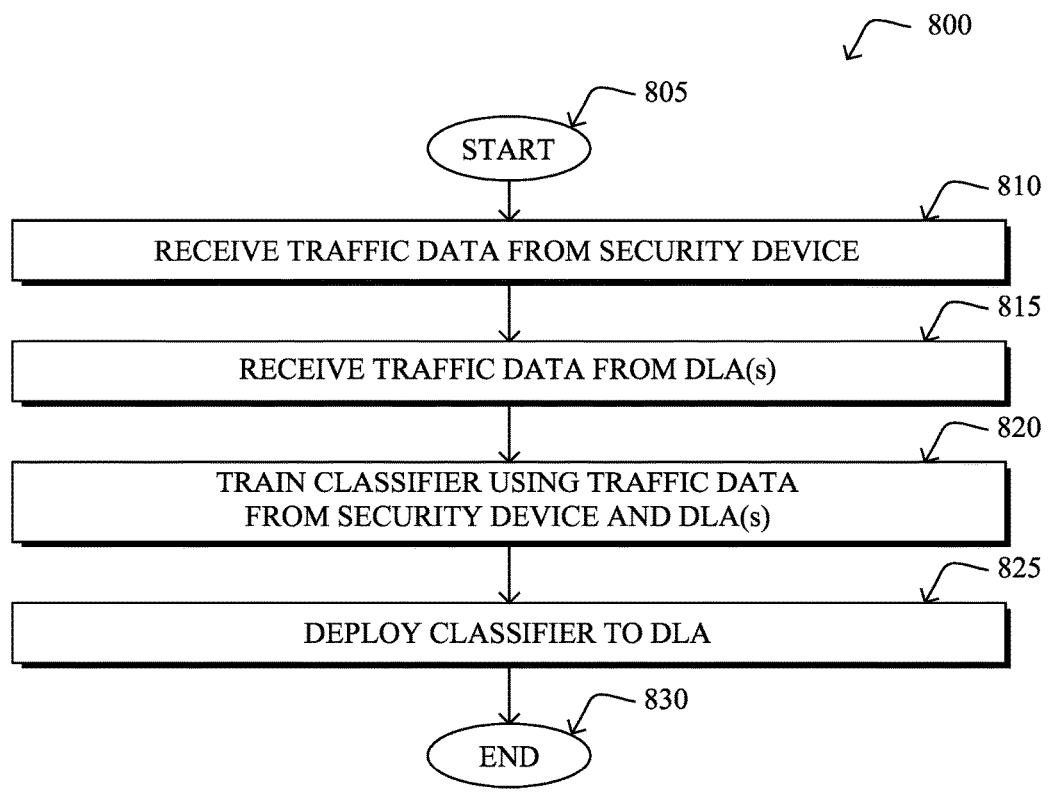
FIG. 8 illustrates an example simplified procedure for training and deploying a traffic classifier in a network.

FIG. 8 illustrates an example simplified procedure for training and deploying a traffic classifier in a network, in accordance with the teaching herein. Procedure 800 may be performed by a specialized computing device in a network, such a supervisory device (e.g., an SCA in an SLN, etc.) by executing stored instructions. Procedure 800 may start at step 805 and continue on to step 810 where, as described in greater detail above, the supervisory device may receive traffic data from a security device in the network. Such a security device may include, for example, a firewall, IDS device, IPS device, or other security device that employs the use of traffic signatures to assess traffic in the network. In some embodiments, the supervisory device may employ a discovery mechanism, to identify the security device in the network.

At step 815, as detailed above, the supervisory device may receive traffic data from one or more DLAs in the network. Such DLAs may, for example, employ machine learning-based anomaly detection to assess traffic in their respective portions of the network. In some embodiments, the supervisory device may schedule the sending of the traffic data from the DLAs based on, e.g., a bandwidth associated with the reporting or topology information regarding the network (e.g., to avoid congestion along certain links). In further embodiments, the supervisory device may request the traffic data from the DLA(s) based on the types of traffic observed by the DLA(s). In another embodiment, the supervisory device may generate a model using traffic data from one of the DLAs and use the model to verify whether the traffic data accurately represents that of another one of the DLAs.

At step 820, the supervisory device may train a classifier using the traffic data from the security device and the one or more DLAs, as described in greater detail above. Notably, the supervisory device may merge the traffic data and their labels (e.g., 'normal' traffic from the DLAs, 'normal' and 'suspicious/attack/etc.' traffic data from the security device) into a training dataset for a machine learning-based classifier capable of classifying further network traffic. For example, the supervisory device may train a deep neural network using the training data, to classify further network traffic.

At step 825, as detailed above, the device may deploy the trained classifier to a selected one of the DLAs. In turn, the DLA may use the classifier to either detect anomalies directly or use the outputs of the classifier to augment the results of its existing anomaly detection mechanism. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a network-based approach for training supervised learning classifiers. In particular, the techniques herein greatly improve the performance of traffic classifiers by linking an anomaly detection SLN with other security devices, allowing for the dynamic training of a classifier using a variety of traffic samples.

While there have been shown and described illustrative embodiments that provide for a network-based approach for training supervised learning classifiers, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   dynamically discovering, by a supervisory device in a network, a security device that uses traffic signatures to assess traffic in the network;
   generating, by the supervisory device, a given rule regarding when traffic data from the security device is sent to the supervisory device;
   receiving, at the supervisory device, the traffic data from the security device based on the given rule;
   receiving, at the supervisory device, traffic data from one or more distributed learning agents that use machine learning-based anomaly detection to assess traffic in the network;
   training, by the supervisory device, a traffic classifier using the received traffic data from the security device and from the one or more distributed learning agents; and
   deploying, by the supervisory device, the traffic classifier to a selected one of the one or more distributed learning agents.

2. The method as in claim 1, wherein the security device comprises at least one of: a firewall, an intrusion detection device, or an intrusion prevention device.

3. The method as in claim 1, further comprising:
   sending, by the supervisory device, a discovery request to the security device; and
   receiving, at the supervisory device, a discovery acknowledgement from the security device in response to the discovery request, wherein the discovery acknowledgement indicates one or more capabilities of the security device.

4. The method as in claim 1, further comprising:
   sending, by the supervisory device, a traffic sample request to the security device for the traffic data received from the security device, wherein the traffic sample request indicates at least one of: a particular signature of which the requested traffic should or should not match, a traffic type, or a time at which the security device is to send the traffic data.

5. The method as in claim 1, further comprising:
   scheduling, by the supervisory device, when the one or more distributed learning agents are to send the traffic data to the supervisory device based on a topology of the network or a bandwidth utilization.

6. The method as in claim 1, further comprising:
   requesting, by the supervisory device, the traffic data received from the one or more distributed learning agents based on one or more traffic categories associated with the one or more distributed learning agents.

7. The method as in claim 1, further comprising:
   receiving, by the supervisory device, traffic data from a first agent;
   generating, by the supervisory device, a statistical model using the traffic data from the first agent; and
   using, by the supervisory device, the statistical model to verify whether the traffic data from the first agent is representative of traffic from a second agent.

8. The method as in claim 7, further comprising:
   requesting, by the supervisory device, the traffic data from the second agent, in response to a determination that the traffic data from the first agent is not representative of the traffic data from the second agent.

9. The method as in claim 1, wherein the traffic classifier comprises a deep neural network.

10. An apparatus, comprising:
    one or more network interfaces to communicate with a network;
    a processor coupled to the network interfaces and configured to execute one or more processes; and
    a memory configured to store a process executable by the processor, the process when executed operable to:
      dynamically discover a security device that uses traffic signatures to assess traffic in the network;
      generate a given rule regarding when traffic data from the security device is sent to the supervisory device;
      receive the traffic data from the security device based on the given rule;
      receive traffic data from one or more distributed learning agents that use machine learning-based anomaly detection to assess traffic in the network;
      train a traffic classifier using the received traffic data from the security device and from the one or more distributed learning agents; and
      deploy the traffic classifier to a selected one of the one or more distributed learning agents.

11. The apparatus as in claim 10, wherein the security device comprises at least one of: a firewall, an intrusion detection device, or an intrusion prevention device.

12. The apparatus as in claim 10, wherein the process when executed is further operable to:
    send a discovery request to the security device; and
    receive a discovery acknowledgement from the security device in response to the discovery request, wherein the discovery acknowledgement indicates one or more capabilities of the security device.

13. The apparatus as in claim 10, wherein the process when executed is further operable to:
    send a traffic sample request to the security device for the traffic data received from the security device, wherein the traffic sample request indicates at least one of: a particular signature of which the requested traffic should or should not match, a traffic type, or a time at which the security device is to send the traffic data.

14. The apparatus as in claim 10, wherein the process when executed is further operable to:
    schedule when the one or more distributed learning agents are to send the traffic data to the apparatus based on a topology of the network or a bandwidth utilization.

15. The apparatus as in claim 10, wherein the process when executed is further operable to:
    request the traffic data received from the one or more distributed learning agents based on one or more traffic categories associated with the one or more distributed learning agents.

16. The apparatus as in claim 10, wherein the process when executed is further operable to:
    receive traffic data from a first agent;
    generate a statistical model using the traffic data from the first agent; and
    use the statistical model to verify whether the traffic data from the first agent is representative of traffic from a second agent.

17. The apparatus as in claim 16, wherein the process when executed is further operable to:

request the traffic data from the second agent, in response to a determination that the traffic data from the first agent is not representative of the traffic data from the second agent.

18. The apparatus as in claim 10, wherein the traffic classifier comprises a deep neural network.

19. A tangible, non-transitory, computer-readable medium storing program instructions that cause a supervisory device in a network to execute a process comprising:

dynamically discovering, by a supervisory device in a network, a security device that uses traffic signatures to assess traffic in the network;

generating, by the supervisory device, a given rule regarding when traffic data from the security device is sent to the supervisory device;

receiving, at the supervisory device, the traffic data from the security device based on the given rule;

receiving, at the supervisory device, traffic data from one or more distributed learning agents that use machine learning-based anomaly detection to assess traffic in the network;

training, by the supervisory device, a traffic classifier using the received traffic data from the security device and from the one or more distributed learning agents; and deploying, by the supervisory device, the traffic classifier to a selected one of the one or more distributed learning agents.

20. The tangible, non-transitory, computer-readable medium as in claim 19, wherein the security device comprises at least one of: a firewall, an intrusion detection device, or an intrusion prevention device.

\* \* \* \* \*

UNITED STATES PATENT AND TRADEMARK OFFICE
CERTIFICATE OF CORRECTION

PATENT NO. : 10,187,413 B2
APPLICATION NO. : 15/212597
DATED : January 22, 2019
INVENTOR(S) : Jean-Philippe Vasseur et al.

Page 1 of 1

It is certified that error appears in the above-identified patent and that said Letters Patent is hereby corrected as shown below:

In the Specification

In Column 6, Line 33, please amend as shown:
VPN" <draft-ietf-l2vpn-evpn>, introduce a solution for In Column 15, Line 51, please amend as shown:
signature S1 coming from outside of the network. In another Signed and Sealed this
Twenty-fourth Day of December, 2019

Andrei Iancu
*Director of the United States Patent and Trademark Office*